US012689626B2

(12) United States Patent
Eberlein

(10) Patent No.: US 12,689,626 B2
(45) Date of Patent: Jul. 21, 2026

(54) GUIDED BACKING SERVICES PROVISIONING FOR CLOUD NATIVE SOFTWARE SYSTEMS

(71) Applicant: SAP SE, Walldorf (DE)

(72) Inventor: Peter Eberlein, Malsch (DE)

(73) Assignee: SAP SE, Walldorf (DE)

( * ) Notice: Subject to any disclaimer, the term of this patent is extended or adjusted under 35 U.S.C. 154(b) by 55 days.

(21) Appl. No.: 18/508,714

(22) Filed: Nov. 14, 2023

(65) Prior Publication Data

US 2025/0158991 A1 May 15, 2025

(51) Int. Cl.
    *H04L 29/06*      (2006.01)
    *G06F 9/54*       (2006.01)
    *H04L 9/40*       (2022.01)
    *H04L 47/70*      (2022.01)

(52) U.S. Cl.
    CPC .............. *H04L 63/10* (2013.01); *G06F 9/547* (2013.01); *H04L 47/821* (2013.01)

(58) Field of Classification Search
    CPC ........ G06F 9/547; H04L 47/821; H04L 63/10
    See application file for complete search history.

(56) References Cited

U.S. PATENT DOCUMENTS

| | | | |
|---|---|---|---|
| 7,657,575 B2 | 2/2010 | Eberlein et al. |
| 7,720,992 B2 | 5/2010 | Brendle et al. |
| 7,739,387 B2 | 6/2010 | Eberlein et al. |

| | | | |
|---|---|---|---|
| 8,126,919 B2 | 2/2012 | Eberlein |
| 8,225,303 B2 | 7/2012 | Wagner et al. |
| 8,375,130 B2 | 2/2013 | Eberlein et al. |
| 8,402,086 B2 | 3/2013 | Driesen et al. |
| 8,407,297 B2 | 3/2013 | Schmidt-Karaca et al. |
| 8,434,060 B2 | 4/2013 | Driesen et al. |
| 8,467,817 B2 | 6/2013 | Said et al. |
| 8,560,876 B2 | 10/2013 | Driesen et al. |
| 8,566,784 B2 | 10/2013 | Driesen et al. |
| 8,572,369 B2 | 10/2013 | Schmidt-Karaca et al. |
| 8,604,973 B2 | 12/2013 | Schmidt-Karaca et al. |
| 8,612,406 B1 | 12/2013 | Said et al. |
| 8,631,406 B2 | 1/2014 | Driesen et al. |
| 8,645,483 B2 | 2/2014 | Odenheimer et al. |
| 8,706,772 B2 | 4/2014 | Hartig et al. |
| 8,732,083 B2 | 5/2014 | Vasing et al. |
| 8,751,573 B2 | 6/2014 | Said et al. |
| 8,805,986 B2 | 8/2014 | Driesen et al. |
| 8,875,122 B2 | 10/2014 | Driesen et al. |
| 8,880,486 B2 | 11/2014 | Driesen et al. |
| 8,972,934 B2 | 3/2015 | Driesen et al. |

(Continued)

OTHER PUBLICATIONS

U.S. Appl. No. 17/938,101, Eberlein et al., filed Oct. 5, 2022.

(Continued)

*Primary Examiner* — Dao Q Ho
(74) *Attorney, Agent, or Firm* — Fish & Richardson P.C.

(57) ABSTRACT

Methods, systems, and computer-readable storage media for determining a demand for private cloud resources including hardware resources and software resources, initiating a workflow for retrieving the private cloud resources, determining an availability of the private cloud resources, providing an instruction to provision service instances according to the demand for the private cloud resources, and providing an access to the service instances using the private cloud resources.

18 Claims, 4 Drawing Sheets

(56) References Cited

U.S. PATENT DOCUMENTS

| | | | |
|---|---|---|---|
| 9,003,356 B2 | 4/2015 | Driesen et al. |
| 9,009,105 B2 | 4/2015 | Hartig et al. |
| 9,032,406 B2 | 5/2015 | Eberlein |
| 9,069,984 B2 | 6/2015 | Said et al. |
| 9,077,717 B2 | 7/2015 | Said et al. |
| 9,122,669 B2 | 9/2015 | Demant et al. |
| 9,137,130 B2 | 9/2015 | Driesen et al. |
| 9,182,979 B2 | 11/2015 | Odenheimer et al. |
| 9,223,985 B2 | 12/2015 | Eberlein et al. |
| 9,256,840 B2 | 2/2016 | Said et al. |
| 9,262,763 B2 | 2/2016 | Peter et al. |
| 9,336,227 B2 | 5/2016 | Eberlein et al. |
| 9,348,929 B2 | 5/2016 | Eberlein |
| 9,354,860 B2 | 5/2016 | Eberlein et al. |
| 9,354,871 B2 | 5/2016 | Eberlein et al. |
| 9,367,199 B2 | 6/2016 | Klemenz et al. |
| 9,652,214 B1 | 5/2017 | Eberlein |
| 9,652,744 B2 | 5/2017 | Eberlein et al. |
| 9,672,140 B1 | 6/2017 | Eberlein |
| 9,703,554 B2 | 7/2017 | Eberlein et al. |
| 9,720,994 B2 | 8/2017 | Driesen et al. |
| 9,721,116 B2 | 8/2017 | Driesen et al. |
| 9,740,476 B2 | 8/2017 | Eberlein et al. |
| 9,800,689 B2 | 10/2017 | Said et al. |
| 9,830,138 B2 | 11/2017 | Said et al. |
| 9,836,299 B2 | 12/2017 | Eberlein et al. |
| 9,854,045 B2 | 12/2017 | Said et al. |
| 9,858,309 B2 | 1/2018 | Eberlein et al. |
| 9,875,273 B2 | 1/2018 | Eberlein et al. |
| 9,898,279 B2 | 2/2018 | Eberlein et al. |
| 9,898,494 B2 | 2/2018 | Eberlein et al. |
| 9,898,495 B2 | 2/2018 | Eberlein et al. |
| 9,927,992 B2 | 3/2018 | Driesen et al. |
| 10,013,337 B2 | 7/2018 | Eberlein et al. |
| 10,061,788 B2 | 8/2018 | Said et al. |
| 10,120,886 B2 | 11/2018 | Eberlein et al. |
| 10,157,052 B2 | 12/2018 | Eberlein et al. |
| 10,185,552 B2 | 1/2019 | Eberlein et al. |
| 10,230,708 B2 | 3/2019 | Eberlein |
| 10,268,472 B2 | 4/2019 | Eberlein et al. |
| 10,270,743 B2 | 4/2019 | Eberlein |
| 10,291,704 B2 | 5/2019 | Eberlein et al. |
| 10,298,591 B2 | 5/2019 | Eberlein et al. |
| 10,419,445 B2 | 9/2019 | Eberlein et al. |
| 10,437,795 B2 | 10/2019 | Eberlein et al. |
| 10,491,700 B2 | 11/2019 | Eberlein |
| 10,496,401 B2 | 12/2019 | Eberlein et al. |
| 10,505,832 B2 | 12/2019 | Eberlein et al. |
| 10,523,662 B2 | 12/2019 | Eberlein |
| 10,534,585 B1 | 1/2020 | Eberlein et al. |
| 10,536,461 B2 | 1/2020 | De Boer et al. |
| 10,642,609 B1 | 5/2020 | Eberlein et al. |
| 10,659,449 B2 | 5/2020 | Eberlein |
| 10,673,962 B2 | 6/2020 | Mueller et al. |
| 10,685,007 B2 | 6/2020 | Eberlein et al. |
| 10,686,882 B2 | 6/2020 | Eberlein et al. |
| 10,693,989 B2 | 6/2020 | Eberlein et al. |
| 10,700,949 B1 | 6/2020 | Eberlein |
| 10,715,405 B2 | 7/2020 | Eberlein |
| 10,762,075 B2 | 9/2020 | Eberlein et al. |
| 10,853,693 B2 | 12/2020 | Eberlein et al. |
| 10,891,217 B2 | 1/2021 | Eberlein et al. |
| 10,956,150 B2 | 3/2021 | Eberlein et al. |
| 10,977,212 B2 | 4/2021 | Eberlein et al. |
| 10,983,762 B2 | 4/2021 | Eberlein et al. |
| 11,030,164 B2 | 6/2021 | Eberlein et al. |
| 11,050,820 B2 | 6/2021 | Odenheimer et al. |
| 11,106,816 B2 | 8/2021 | Eberlein et al. |
| 11,119,883 B1 | 9/2021 | Eberlein et al. |
| 11,121,943 B2 | 9/2021 | Eberlein et al. |
| 11,153,394 B1 | 10/2021 | Eberlein et al. |
| 11,206,305 B1 | 12/2021 | Eberlein et al. |
| 11,218,388 B2 | 1/2022 | Eberlein |
| 11,249,812 B2 | 2/2022 | Eberlein et al. |
| 11,269,717 B2 | 3/2022 | Eberlein et al. |
| 11,310,328 B2 | 4/2022 | Eberlein |
| 11,347,873 B2 | 5/2022 | Eberlein |
| 11,354,302 B2 | 6/2022 | Eberlein et al. |
| 11,368,547 B2 | 6/2022 | Eberlein |
| 11,379,217 B1 | 7/2022 | Eberlein et al. |
| 11,405,472 B2 | 8/2022 | Eberlein et al. |
| 11,409,719 B2 | 8/2022 | Eberlein |
| 11,418,550 B1 | 8/2022 | Eberlein et al. |
| 11,438,437 B1 | 9/2022 | Eberlein et al. |
| 11,451,537 B2 | 9/2022 | Eberlein |
| 11,463,309 B1 | 10/2022 | Eberlein et al. |
| 11,537,364 B2 | 12/2022 | Eberlein et al. |
| 11,561,836 B2 | 1/2023 | Eberlein et al. |
| 11,687,670 B2 | 6/2023 | Eberlein et al. |
| 11,693,945 B2 | 7/2023 | Engler et al. |
| 11,797,879 B2 | 10/2023 | Eberlein et al. |
| 2009/0106371 A1 | 4/2009 | Schmidt-Karaca et al. |
| 2009/0106372 A1 | 4/2009 | Schmidt-Karaca et al. |
| 2009/0150479 A1 | 6/2009 | Eberlein et al. |
| 2009/0172110 A1 | 7/2009 | Eberlein et al. |
| 2010/0088205 A1* | 4/2010 | Robertson ............ G06Q 20/102 |
| | | 705/400 |
| 2011/0154445 A1 | 6/2011 | Schmidt-Karaca et al. |
| 2012/0136839 A1 | 5/2012 | Eberlein et al. |
| 2013/0085810 A1 | 4/2013 | Driesen et al. |
| 2013/0144918 A1 | 6/2013 | Said et al. |
| 2013/0166415 A1 | 6/2013 | Odenheimer et al. |
| 2013/0166416 A1 | 6/2013 | Eberlein |
| 2013/0324201 A1 | 12/2013 | Eberlein et al. |
| 2013/0325672 A1 | 12/2013 | Odenheimer et al. |
| 2013/0339488 A1 | 12/2013 | Eberlein et al. |
| 2014/0025441 A1 | 1/2014 | Eberlein et al. |
| 2014/0047319 A1 | 2/2014 | Eberlein |
| 2014/0149158 A1 | 5/2014 | Odenheimer et al. |
| 2014/0164963 A1 | 6/2014 | Klemenz et al. |
| 2014/0372981 A1 | 12/2014 | Said et al. |
| 2014/0379926 A1* | 12/2014 | Patel ................... H04L 67/1001 |
| | | 709/226 |
| 2015/0006691 A1* | 1/2015 | Satapathy ............. H04L 63/107 |
| | | 709/223 |
| 2015/0188890 A1 | 7/2015 | Said et al. |
| 2015/0220576 A1 | 8/2015 | Eberlein |
| 2015/0222665 A1 | 8/2015 | Eberlein et al. |
| 2016/0026698 A1 | 1/2016 | Eberlein et al. |
| 2016/0127325 A1 | 5/2016 | Odenheimer et al. |
| 2017/0161511 A1 | 6/2017 | Eberlein et al. |
| 2017/0171023 A1* | 6/2017 | Chiu ................... H04L 41/0895 |
| 2017/0171233 A1 | 6/2017 | Odenheimer et al. |
| 2017/0195247 A1* | 7/2017 | Tao ......................... H04L 67/10 |
| 2018/0041568 A1 | 2/2018 | Eberlein |
| 2018/0121236 A1 | 5/2018 | Odenheimer et al. |
| 2018/0300332 A1 | 10/2018 | Odenheimer et al. |
| 2019/0268435 A1* | 8/2019 | Konoor .............. H04L 67/5681 |
| 2019/0340260 A1 | 11/2019 | Eberlein et al. |
| 2020/0175336 A1 | 6/2020 | Eberlein et al. |
| 2020/0183812 A1 | 6/2020 | Eberlein et al. |
| 2020/0195527 A1 | 6/2020 | Eberlein |
| 2020/0304385 A1 | 9/2020 | Eberlein |
| 2020/0351367 A1 | 11/2020 | Eberlein |
| 2020/0364604 A1 | 11/2020 | Eberlein et al. |
| 2020/0409669 A1* | 12/2020 | Mohan ...................... G06F 8/76 |
| 2021/0042160 A1* | 2/2021 | Alamouti .............. G06F 9/5011 |
| 2021/0056105 A1* | 2/2021 | Tiwary ................ G06F 16/2462 |
| 2021/0064433 A1* | 3/2021 | Nakfour ................ G06F 9/5027 |
| 2021/0073411 A1 | 3/2021 | Eberlein et al. |
| 2021/0149915 A1* | 5/2021 | Lee ..................... G06F 16/2282 |
| 2021/0182108 A1 | 6/2021 | Eberlein et al. |
| 2021/0182251 A1 | 6/2021 | Eberlein et al. |
| 2022/0052922 A1* | 2/2022 | Meyer ................... G06F 16/252 |
| 2022/0108206 A1* | 4/2022 | Driesen ................. G06N 20/00 |
| 2022/0217208 A1 | 7/2022 | Eberlein et al. |
| 2022/0292420 A1 | 9/2022 | Eberlein et al. |
| 2022/0300490 A1 | 9/2022 | Eberlein et al. |
| 2022/0335031 A1 | 10/2022 | Eberlein et al. |
| 2022/0391305 A1 | 12/2022 | Eberlein et al. |
| 2022/0398258 A1 | 12/2022 | Eberlein et al. |
| 2023/0019160 A1 | 1/2023 | Eberlein |
| 2023/0041514 A1 | 2/2023 | Eberlein et al. |

(56)         References Cited

U.S. PATENT DOCUMENTS

| 2023/0142150 A1* | 5/2023 | Flores | ..................... G06F 9/547 |
| | | | 709/203 |
| 2023/0169528 A1 | 6/2023 | Eberlein et al. | |
| 2023/0195422 A1 | 6/2023 | Eberlein et al. | |
| 2023/0315723 A1 | 10/2023 | Eberlein et al. | |
| 2023/0325377 A1 | 10/2023 | Eberlein et al. | |

OTHER PUBLICATIONS

U.S. Appl. No. 17/979,423, Eberlein et al., filed Nov. 2, 2022.
U.S. Appl. No. 17/983,045, Eberlein, filed Nov. 8, 2022.
U.S. Appl. No. 18/048,578, Eberlein et al., filed Oct. 21, 2022.
U.S. Appl. No. 18/191,343, Eberlein et al., filed Mar. 28, 2023.
U.S. Appl. No. 18/209,234, Eberlein, filed Jun. 13, 2023.
U.S. Appl. No. 18/298,634, Eberlein et al., filed Apr. 11, 2023.
U.S. Appl. No. 18/298,661, Eberlein, filed Apr. 11, 2023.
U.S. Appl. No. 18/327,370, Eberlein et al., filed Jun. 1, 2023.
U.S. Appl. No. 18/488,159, Eberlein et al., filed Oct. 17, 2023.
U.S. Appl. No. 18/491,350, Eberlein et al., filed Oct. 20, 2023.
U.S. Appl. No. 18/498,674, Eberlein et al., filed Oct. 31, 2023.

* cited by examiner

300

RECEIVE RESOURCE MONITORING REPORT
302

RECEIVE FAILED DEPLOYMENT REPORT
304

RECEIVE DEPLOYMENT SCAN REPORT
306

DETERMINE DEMAND FOR RESOURCES
308

INITIATE WORKFLOW
310

DETERMINE AVAILABILITY OF RESOURCES
312

PREPARE INSTANCES
314

COMPLETE WORKFLOW
316

INITIATE DEPLOYMENT
318

GUIDED BACKING SERVICES PROVISIONING FOR CLOUD NATIVE SOFTWARE SYSTEMS

TECHNICAL FIELD

The present disclosure relates to provisioning of private cloud resources.

BACKGROUND

Private cloud environments are computing environments with limited resources that require careful planning to optimize the use of its capacity, which is significantly lower than the capacity of public cloud environments. Despite the difference in capacity, private cloud environments are sometimes preferred for protecting sensitive data. As data volume increases, more storage capacity is needed, which can be provided by more hardware. As a difference to public cloud environments, provisioning of backing services in private cloud environments, like databases, key/value stores, message queues, etc., often imply a manual setup. Planning is required to pick a correct compute unit and storage space where a service should be installed, and deployment and configuration can also require additional tasks that are at least to a particular degree manual to allow necessary adjustments in a comparably small-scale setup of the private cloud deployment.

SUMMARY

Implementations of the present disclosure are directed to on-premise provisioning of private cloud resources. More particularly, implementations of the present disclosure are directed to hardware and software management for optimizing access to service instances using private cloud resources.

In some implementations, a computer-implemented method includes: determining, by one or more processors, a demand for private cloud resources including hardware resources and software resources, initiating, by the one or more processors, a workflow for retrieving the private cloud resources, determining, by the one or more processors, an availability of the private cloud resources, providing, by the one or more processors, an instruction to provision service instances according to the demand for the private cloud resources, and providing, by the one or more processors, an access to the service instances using the private cloud resources.

The present disclosure also provides a computer-readable storage medium coupled to one or more processors and having instructions stored thereon which, when executed by the one or more processors, cause the one or more processors to perform operations including determining a demand for private cloud resources including hardware resources and software resources, initiating a workflow for retrieving the private cloud resources, determining an availability of the private cloud resources, providing an instruction to provision service instances according to the demand for the private cloud resources, and providing an access to the service instances using the private cloud resources.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations including determining a demand for private cloud resources including hardware resources and software resources, initiating a workflow for retrieving the private cloud resources, determining an availability of the private cloud resources, providing an instruction to provision service instances according to the demand for the private cloud resources, and providing an access to the service instances using the private cloud resources.

These and other implementations can each optionally include one or more of the following features: Demand is predicted based on processing deployment data of a private cloud system. Deployment data is retrieved from a plurality of external data stores and includes, for example, software maintenance calendars, deployment pipelines, or project schedules. The computer-implemented method and/or the operations can further include aggregating, by the one or more processors, along a timeline, the deployment data retrieved from the plurality of external data stores. A hardware resource demand is predicted based on processing a software resource demand. The demand is predicted based on patterns of available private cloud resources within the private cloud system. Demand for the private cloud resources is received from one or more customer devices and is prioritized based on estimated times to access the private cloud resources. The demand for the private cloud resources is determined based on a failed deployment of a private cloud service. Provisioning service instances according to the demand for the private cloud resources includes limiting a size of an available private cloud resources to a match a requested size of a respective private cloud resource. A workflow includes parameters defining connections to networks and databases. Provisioning the service instances according to the demand for the private cloud resources includes parametrizing generic service instances based on the demand.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Figure 1:
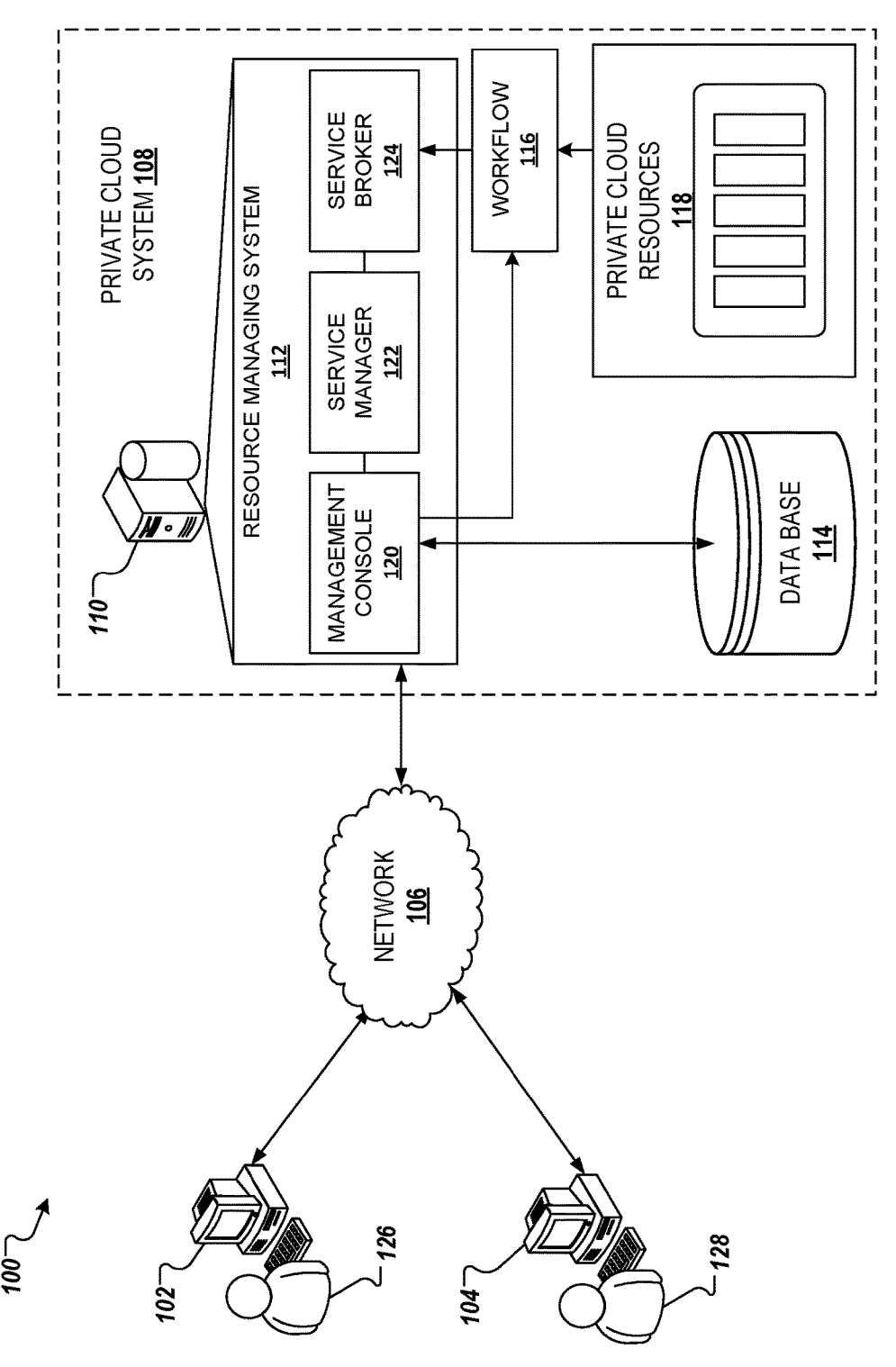
FIG. 1 depicts an example high-level architecture in accordance with implementations of the present disclosure.

Implementations of the present disclosure are directed to on-premise provisioning of private cloud resources. More particularly, implementations of the present disclosure are directed to hardware and software management for optimizing access to service instances using private cloud resources. Implementations can include actions of determining a demand for private cloud resources including hardware resources and software resources, initiating a workflow for retrieving the private cloud resources, determining an availability of the private cloud resources, providing an instruction to provision service instances according to the demand for the private cloud resources, and providing an access to the service instances using the private cloud resources.

Addressing the limitations of traditional provisioning of private cloud resources, the actively planned provisioning of private cloud resources described in the present disclosure enables optimized access to the service instances using private cloud resources designed for protecting sensitive data. Traditionally, provisioning of backing services (e.g., databases, key/value stores, and message queues) involves a manual setup, instead of a fully automated process. For example, traditional processes in on-premise computing environment (e.g., requesting hardware to be ordered and software to be installed and configured), are driven by lengthy manual processes that start after a demand for new resources is received. Such traditional lengthy processes in an on-premise computing environment are traditionally perceived as detrimentally impacting a cloud-computing experience. Implementations of the present disclosure provide continuous planning of private cloud resource adjustments, to select compute units and storage space for new services being installed, prior to a receipt of a demand for new private cloud resources. The continuous planning of private cloud resource adjustments described herein can advantageously include optimized demand-based deployment of the pre-planned private cloud resources. Another advantage of the described provisioning of private cloud resources stems from bridging a gap between accessing the service instances using the private cloud resources relative to a public cloud environment.

Private cloud resource solutions are deployed based on demand predicted based on patterns of available private cloud resources within a private cloud system. An example pattern can be extracted from historical data that indicates recurring patterns of program execution capacity use, satisfaction of a particular logical operation or other combination of values for multiple performance characteristics that can be combined using logical operators such as AND, NOT, OR, etc. and/or in other manners. For example, the private cloud system can have changing capabilities (e.g., increased hardware resources over time), that can have different associated fees for use, can support different types of user programs (e.g., virtual machine software image instances of different sizes, or programs with different types of resource criteria and/or computing resource usage, such as differing patterns of input/output (I/O), memory access, and network usage). The patterns can be generated by (e.g., automatically) grouping historical hardware usage parameters relative to remaining available hardware resources according to patterns of software usage and their respective lifecycles, which can be further analyzed based on constraints and/or assignments regarding which hardware resources were selected for executing particular programs.

Software resources that can be managed include multiple processes and activities, such as provisioning, updating, patching, LM, removal, monitoring and alerting, root cause analysis (RCA), among numerous others. For example, provisioning can include the initial deployment and configuration of a software resource in landscapes or tenants. Updating can be described as recurring deployment and configuration of a new solution version and/or, depending on the update scheme, new versions of individual solution components into existing landscapes and/or tenants. Updating can provide new functionality and features which might also imply the addition and/or removal of solution components and/or backing services. Patching can be used between updates to make corrections (e.g., security patches), but typically does not introduce new functionality. Removal can include decommissioning and deletion of tenants, solutions, or even landscapes. Monitoring and alerting can include retrieval of metrics describing the behavior of the solution, backing services, and the underlying platform. Metrics are evaluated against thresholds and, in response to exceeding thresholds, for example, alerts are created and displayed on administrator user devices. Other processes/activities of managing private cloud resources can include user management, access management, security management, back-up and restore, among various others. In view of the previous context, implementations of the present disclosure provide a provisioning planning model for cloud-native, service-based applications deployed to cloud infrastructures that are described in detail with reference to FIGS. 1-4.

FIG. 1 depicts an example architecture 100 in accordance with implementations of the present disclosure. In the depicted example, the example architecture 100 includes one or more user devices 102, 104, a network 106, and a private cloud system 108. Although shown separately, in some implementations, functionality of two or more systems or servers can be provided by a single system or server. In some implementations, the functionality of one illustrated system, server, or component can be provided by multiple systems, servers, or components, respectively.

The private cloud system 108 includes one or more server devices 110 hosting a resource management system 112, databases (e.g., processors, memory) 114, a workflow module 116, and private cloud resources 118. The resource management system 112 includes a management console 120, a service manager 122, and a service broker 124. In the depicted example, respective users 126, 128 interact with the user devices 102, 104 for accessing services provided by the private cloud system 108 and to provide user inputs to request new services to be provided by the private cloud system 108. In an example context, the users 126, 128 can include users (e.g., enterprise operators and maintenance agents) who interact with one or more data analytics systems hosted by the private cloud system 108.

In private cloud platforms, the users 126, 128 can perform operations, which can be referred to as information technology (IT) operations, for the administration of the private cloud system 108. In some examples, users 126, 128 are provided with global credentials within the private cloud system 108 that uniquely identifies the users 126, 128 within the private cloud system 108. In some examples, each of the users 126, 128 can be assigned to one or more roles, each role having a set of privileges representing operations that the respective user 126, 128 is allowed to perform. In some examples, the users 126, 128 can be assigned to one or more groups, each group having a set of permissions representing operations that users, who are members of the group, are allowed to perform (e.g., one or more roles can be assigned to a group and members of the group inherit the one or more roles). For example, and without limitation, a user 126 can be included in an administrator group that includes administrator privileges (e.g., root privileges) that enable the user (e.g., as an administrator) to execute operations within the private cloud system 108, such as providing an authorization for parametrizing generic service instances based on a service demand received from another user 128. Example operations can include, without limitation, resource configuration, deployment enablement, data migration, and resource clean-up.

In some examples, the user devices 102, 104 includes any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some examples, the user devices 102, 104 can communicate with the private cloud system 108 over the network 106.

In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In the example of FIG. 1, the server device 110 is intended to represent various forms of servers including, but not limited to a web server, an application server, a proxy server, a network server, and/or a server pool. In general, server systems accept requests for application services and provides such services to any number of user devices (e.g., the user devices 102, 104 over the network 106).

The databases (e.g., processors, memory) 114 can include any type of database module and can take the form of volatile and/or non-volatile memory including, without limitation, magnetic media, optical media, random access memory (RAM), read-only memory (ROM), removable media, or any other suitable local or remote memory component. The database (e.g., processors, memory) 114 can store various objects or data, including caches, classes, frameworks, applications, backup data, application objects, jobs, web pages, web page templates, database tables, database queries, repositories storing application data and/or dynamic information, and any other appropriate information including any parameters, variables, algorithms, instructions, rules, constraints, or references thereto associated with the purposes of the private cloud system 108.

The workflow module 116 can provide commands that can affect one or more private cloud resources 118 in the private cloud system 108. The private cloud resources 118 represent resources that are provisioned within the private cloud system 108 for use by the user devices 102, 104 that can be affiliated with an entity (e.g., an organization). Example resources can include, without limitation, database systems, applications, servers, physical machines, virtual machines, containers, and the like. In some examples, the private cloud resources 118 can be provisioned within the private cloud system 108 and can be adjusted according to provisioning plans and demands from the user devices 102, 104. For example, any administrator-level command that is entered through a Linux console, to a Windows shell, or the like and is transmitted by the user devices 102, 104 to the management console 120 of the resource managing system 112, is directed to the workflow module 116. In this manner, such administrator-level commands are not directly communicated to the private cloud resources 118.

The workflow module 116 can process the commands to determine the request for the private cloud resources 118 and transmit a response to the service broker 124 that can communicate with the service manager 122 to generate a response. The service broker 124 determines whether a service instance as requested is available (that is, in stock in the private cloud resources 118), and, if available, the service broker 124 configures the available service and transmits the respective instance to the service manager 122, which forwards the available service instance to the user devices 102, 104. In response to determining, by service broker 124, that the requested service instance is not available, the service broker 124 transmits an indication of the unavailable instance to the service manager 122, which generates an error report. The service manager 122 transmits the error report to the management console 120, which can initiate a provisioning management process to adjust the private cloud resources 118. In some implementations, the service manager 122 can also be configured to control service operations performed by the private cloud system 108 and to perform verifications of whether the operation is risk-oriented for the private cloud resources 118. The overall operation information is stored and maintained in a trackable form. In some implementations, the account mapping is stored, by the service manager 122, in the database 114, which enables components, such as the service broker 124, to interact with the information in real-time. In this manner, services can be monitored and tracked in real-time, to timely adjust access to the private cloud resources 118 and adjust provisioning planning. Further details regarding the on-premise provisioning of private cloud resources 118 are described with reference to FIG. 2.

Figure 2:
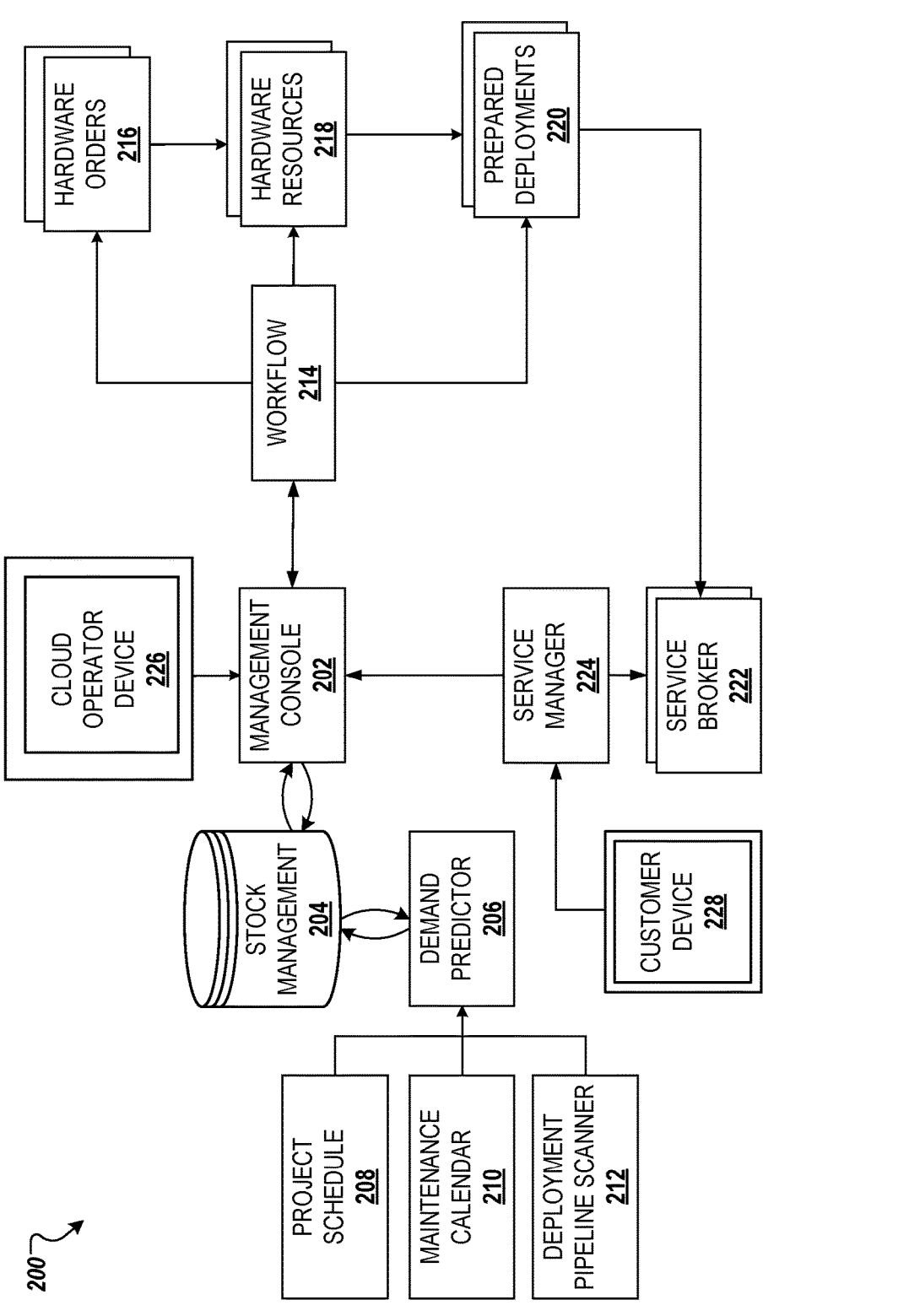
FIG. 2 is a block diagram of an example system that can be used to execute implementations of the present disclosure.

FIG. 2 depicts an example of a guided backing services provisioning system 200 in accordance with implementations of the present disclosure. The example guided backing services provisioning system 200 includes one or more of the components of the example architecture 100 described with reference to FIG. 1. For example, the example guided backing services provisioning system 200 includes a management console 202 (e.g., management console 120 described with reference to FIG. 1), a stock management console 204 (e.g., database 114 described with reference to FIG. 1), a demand predictor 206, a project schedule console 208, a maintenance calendar console 210, a deployment pipeline scanner 212, a workflow module 214 (e.g., workflow module 116 described with reference to FIG. 1), a hardware order module 216, a hardware resource module 218, a prepared deployment module 220, a service broker 222 (e.g., service broker 124 described with reference to FIG. 1), a service manager 224 (e.g., service manager 122 described with reference to FIG. 1), a cloud operator device 226 (e.g., user device 102 described with reference to FIG. 1), and a customer device 228 (e.g., user device 104 described with reference to FIG. 1).

The management console 202 can operate as a central interface for the example guided backing services provisioning system 200. The management console 202 can backed by the persistence of the stock management console 204. The management console 202 can receive from a cloud operator device 226, an overview of (e.g., current and past) service instances in use, service instances in stock, and predicted future demand along a timeline.

The predicted future demand can be aggregated, by the management console 202 and/or the cloud operator device 226, using data obtained (e.g., actively retrieved) from external sources, for example: project schedules (generated by the project schedule console 208), a maintenance calendar (e.g., generated by the maintenance calendar console 210), and deployment pipeline reports (e.g., generated by the deployment pipeline scanner 212).

The project schedules can be generated, by the project schedule console 208, processing user input received from the cloud operator device 226 (of project managers). The project schedules can be stored by the project schedule console 208. The project schedules can include planned projects, an identification of requested service instances, and a timeline of consumption of the service instances. The projects can include new developments, but also temporary demand, such as for a migration task. Some of the service instances requested can be automatically released after a defined timeframe. The defined timeframe can be maintained, by the project schedule console 208, in project schedules, allowing to plan the reuse of freed capacity of the cloud resources in response to determining that a project is completed. The project schedule console 208 can transmit the generated project schedules to the demand predictor 206 for further processing.

The maintenance calendar can be generated, by the maintenance calendar console 210, processing service data relative to project data to redistribute the load for providing an uninterrupted service availability while existing service instances are taken down for maintenance. The maintenance calendar can be defined as projects, having a fixed recurrence. Retaining maintenance information in the maintenance calendar avoids the re-entry of the maintenance information for every upcoming maintenance event again and improves long-term predictions due to the extended planning horizon. The maintenance calendar console 210 can transmit the generated maintenance calendar to the demand predictor 206 for further processing.

The deployment pipelines scanner 212 can be configured to scan deployment pipelines and generate service instance requests. The service instance requests can be created by automated deployment from a deployment pipeline or, interactively, in response to receiving a service request from a developer (consumer) operating a customer device 228 to request ad hoc provisioning. Deployment pipelines can contain information indicating the service instances called in response to the pipeline being executed. In some cases, the timeline from the change of a pipeline in a source control system to the release of this change and finally its execution, can span over hours, corresponding to a longer time interval than when immediate provisioning is requested interactively by a developer operating a customer device 228. The scanning of pipelines can provide an advanced head start for operators to work on provisioning service instances before they are requested. The deployment pipelines scanner 212 can transmit the pipeline scanning results to the demand predictor 206 for further processing.

The demand predictor 206 can process (e.g., aggregate and consolidate) the data received, from the maintenance calendar console 210. The received data includes the maintenance calendar console 210, and the deployment pipelines scanner 212, and historic data retrieved from unscheduled ad hoc demand to generate demand predictions that can be transmitted to the stock management console 204. The demand prediction can estimate future servicing demands, adding a buffer for reactive management on top of planned consumption. Overlaying the demands of various projects, scheduled maintenances, and deployment pipelines along a timeline with projected start and potential end of demand per service provides the insight used by the cloud operator devices 226 to plan projects using the private cloud resources.

The demand predictor 206 can also derive indirect hardware resource demand based on key properties of each service type (e.g., CPU, memory, and storage requirements).

The demand predictor 206 can estimate when the available hardware resources are no longer sufficient to provision additional service instances. For example, the demand predictor 206 can process the input from project schedule console 208 (and the maintenance calendar module 210) to compensate for lengthy procurement processes (and long delivery times) for hardware expansion. A well-planned large-scale project that is expected to consume significant additional resources for the services can be seamlessly implement in view of the service provisioning planned based on the results generated by the demand predictor 206 provided as input to the management console 202. Concurrently planned parallel projects, maintenance and deployments can be evaluated, by the management console 202, in a combined way, based on concrete parameters, taking out the guesswork, and reducing cost of project delays on the one side and over-provisioning on the other side.

The demand predicted, by the demand predictor 206, can be increased by a configurable buffer to compensate for short-dated requests, received from customer devices 228 of interactive developers. Based on demand predicted, by the demand predictor 206, the private cloud system can automatically start various workflows to compensate for upcoming resource shortages. The management console 202 can trigger a prioritized series of workflows (e.g., first ordering new hardware, then getting it set up, and finally consuming it by provisioning service instances on it) and implement a "workflow of workflows" that can be authorized by the operator of the cloud operator device 226 to be executed as individual tasks.

The management console 202 can generate an order for hardware of a particular type with particular parameters. The management console 202 can transmit the requests to a cloud operator device 226 of a purchasing department, stating the concrete information about items (hardware equipment) to be ordered, without a review and interpretation of details about individual services. The information is directly derived from the service type configuration that specifies the hardware requirements of each service. The provisioning service instance can include a number of CPUs and size of memory, a demand for GPUs (such as, for machine learning services), or storage parameter types (e.g., a solid state device (SSD)) and size.

In private cloud environments, the service instance to hardware relation is not necessarily a 1:1 relation. Some services (potentially of different types) can be deployed to a single machine in the private cloud environment, sharing the available resources. In case of shared available resources, the service type configuration includes the information about the fraction of a particular machine type that can be used for provisioning a service instance and the fraction is taken into consideration when hardware requests are determined, by the management console 202.

The management console 202 can receive, from the cloud operator device 226, an indication that the hardware has been delivered. In response to receiving the delivery notice, the management console 202 can generate deployment parameters indicating in which datacenter and network segment the machines can be connected, to be used for the intended deployments. As the management console 202 can provide a mapping of the context about which hardware was ordered for which service demand. The mapping can be used by the management console 202 for streamlining the setup process and accelerating hardware provisioning of the private cloud service.

The last step for a service to be provisioned (which can be the single provisioning step, if sufficient spare hardware capacity is available), is provisioning service instances that are required for executing requested services. The provisioning of the service instances can be transmitted, by the management console 202, to the cloud operator device 226 of an IT software department, which can install the planned and/or requested software. When the software installation is complete, the cloud operator device 226 registers the new available instance with the service broker 222 for the respective service type. The registered instance can be still generic and not allocated to or configured for a specific costumer device 228.

When a developer of a cloud operator device 226 (or an automated process triggered by a deployment pipeline) requests a service instance, the request is transmitted to the service manager 224, for all service types.

The service manager 224 (configured as a service controller) dispatches the request per service type to the corresponding service broker 222. The service broker 222 determines that a service instance as requested is available in stock, as indicated by the stock management console 204, and configures available service instance and sends the available service instance, to the service manager 224. The service manager 224 can forward the available service instance to the costumer device 228. If the service broker 222 determines that no service instance as requested is available in stock, as indicated by the stock management console 204, the service broker 222 reports the service instance availability error.

The service broker 222 sends the service instance availability error to the service manager 224 to generate an alert in the management console 202 and a reactive management process can be started. The reactive management process can include a priority request for provisioning that the cloud operator device 226 can prioritize to process before other requests that have been planned for ahead of time provisioning based on demand prediction. The prioritized processing can affect workflow execution order and can trigger an adjustment of used hardware for provisioning that was actually planned to be used for a different software resource (assuming matching hardware parameters). The adjustment can indirectly trigger a hardware provisioning cycle to fill the gap created for the exceptional short notice request of the reactive management process.

In response to the service broker 222 receiving the request for provisioning a new service instance, the service broker 222 can check for the availability on stock that has been registered by the cloud operator device 226 of the IT software department, after completion of a private cloud resource installation. If an instance of the right type is found, the service broker 222 repurposes the private cloud resource for the customer device 228, by applying the required parameter changes specified in the provisioning request. For example, if the customer device 228 requests a high-availability redundant setup of a service within the private cloud environment, the service broker 222 can select two instances out of the available stock, configure one as the primary and the other as the secondary, and hand back the combination as a single instance. Or, if a smaller instance is requested than available, the service broker 222 can downsize an instance on stock, releasing some hardware capacity that is then free for additional other installations.

According to the described implementations, the example guided backing services provisioning system 200 provides multiple technical advantages, including management of the prepared provisioning of private cloud resources (e.g., hardware and software) using any of proactive management, reactive management, and predictive management, or any combination thereof. The example guided backing services provisioning system 200 leverages multiple input sources and service demand prediction to coordinate execution of workflows. Using an extended service manager 224, the example guided backing services provisioning system 200 enables repurposing of previously installed service instances put in stock for later consumption. The repurposed services can be consumed by customer devices 228 in a seamless manner, such that backing services in private clouds can be automatically implemented.

Figure 3:
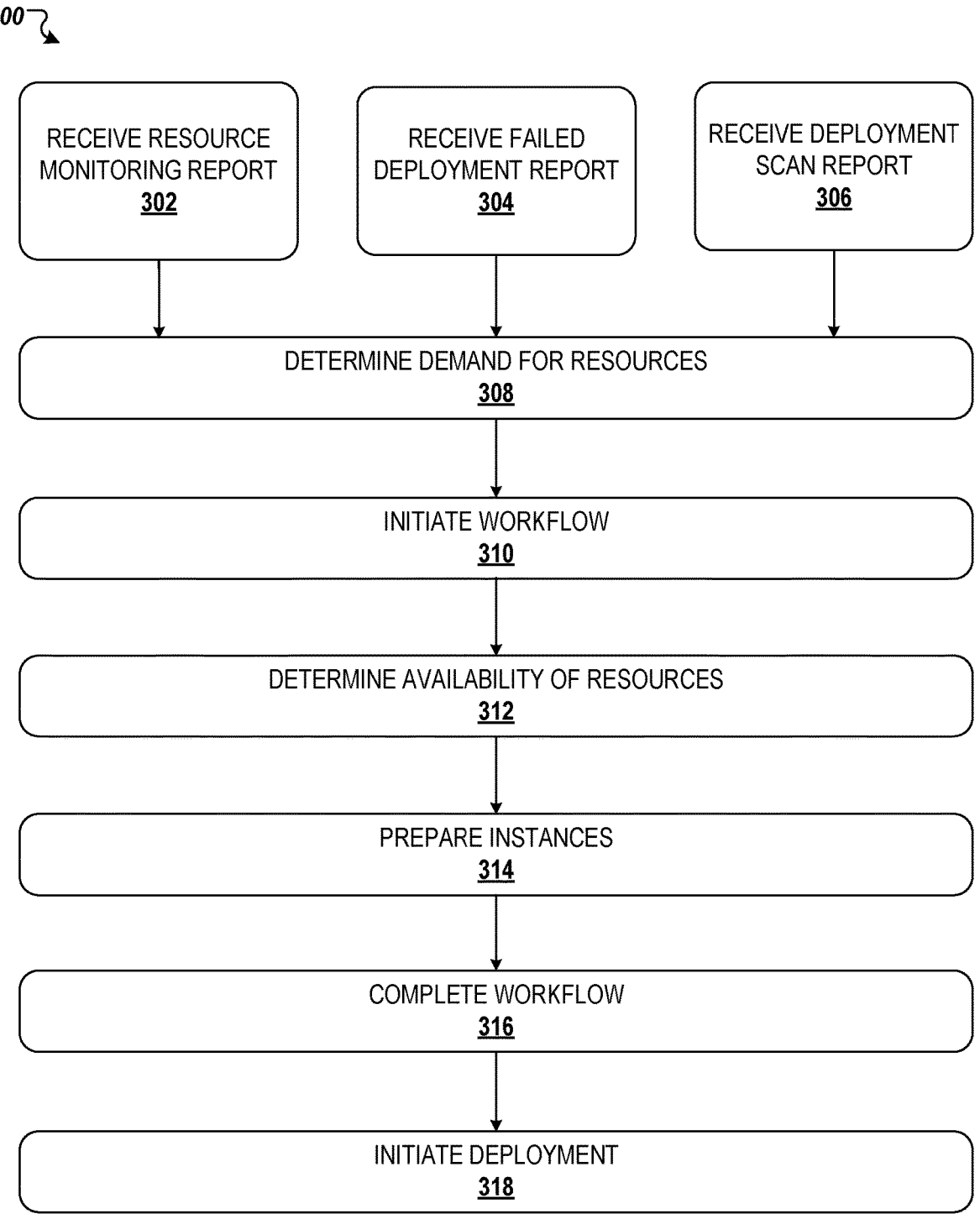
FIG. 3 depicts an example process that can be executed in accordance with implementations of the present disclosure.

FIG. 3 depicts an example process 300 that can be executed in accordance with implementations of the present disclosure. In some examples, the example process 300 is provided using one or more computer-executable programs executed by one or more computing devices, such as a management console 120 of the private cloud system 108 described with reference to FIG. 1 or a management console 202 of the example guided backing services provisioning system 200 described with reference to FIG. 2.

A resource monitoring report is received from a service broker by a management console (302). The resource monitoring report can be generated according to a set schedule defining a frequency of evaluation of available resources within a private cloud service. The frequency of evaluation of available resources can be varied based on trends of demands for private cloud resources, such that the evaluation frequency is increased in response to an increased number of demands for private cloud resources. The resource monitoring report can be generated within a context of a proactive management process that enables stockpiling of prepared service deployments to enable immediate provisioning by performing installation of unformatted generic service instances before provisioning is requested. The proactive management process can be applied to the hardware resource cycle (e.g., generating a resource monitoring report defining trends of hardware resource availability), which is considerably longer (weeks/months instead of hours/days) than software resource cycle. The proactive management process can include advance ordering and setup of hardware resources (e.g., compute and storage units), which enables parametrization of generic service instances based on the demand. The proactive management process can improve the access to the service instances by delivering a planned guide for timely hardware orders.

A failed deployment report is received by a management console (304). For example, a service broker can process stock data received from a stock management to determine that a requested service instance is unavailable in stock. The detection of the unavailability of the requested service instance can trigger (using the service broker) the generation of a service instance unavailability error. The service instance availability error can be sent by the service broker, to the service manager. The service manager can process the service instance unavailability error according to one or more rules to determine a critical level of the service instance unavailability error. The critical level of the service instance unavailability error can be compared to an alert threshold, which if exceeded can be used to generate an alert for the management console and a reactive management process can be started. For example, if prepared service deployments in stock are exhausted, the reactive management processes prioritize additional requests to minimize waiting times for accessing new (unavailable) service instances. Although the reactive management process includes delays, the failed deployment report triggers multiple automatic actions that lead to access to the service instances. The hardware reprovisioning cycle can include unforeseen shortage of hardware resources (compute or storage resources) that can be avoided if a lead time for new hardware orders is too long. For example, the reactive management processes can be optimized by including project planning data in a demand prediction that is part of the hardware cycle. Additionally, by decommissioning other stockpiled service deployments, hardware resources can be freed and made available for a short-term stretch of available hardware resources.

A deployment scan report is received by the management console (306). The deployment scan report can be generated according to a set schedule defining a frequency of evaluation of available resources within a private cloud service. The frequency of evaluation of deployment can be varied based on trends of deployments and/or demands for private cloud resources, such that the evaluation frequency is increased in response to an increased number of deployments and/or demands for private cloud resources. The deployment scan report can be generated within a context of a predictive management process that enables stockpiling deployments of each service. The predictive management process uses multiple input sources to predict a correct number of deployments to be executed within a future time interval. In the context of predictive management process, estimation of available resources within a private cloud are computed using a demand predictor. The demand predictor can execute a prediction model including a machine learning algorithm (e.g., programmed into a logic component of the private cloud system). The estimation of available resources within the private cloud can range from relatively simple computations (e.g., by processing software maintenance calendars that list planned upgrades and migrations, temporarily requiring additional services, scans of deployment pipelines, anticipating additional resource conditions for a subsequent deployment, and project schedules for upcoming development or implementation projects) to complex computations (e.g., applying predictive models to software resource demand data and deployment data of a private cloud system for determining the probability of future demands for private cloud resources). The deployment data can be actively retrieved (through set monitors) from a plurality of external data stores and includes any of software maintenance calendars, deployment pipelines, or project schedules. The deployment data retrieved from the plurality of external data stores can be aggregated along a timeline. In some example implementations, the machine learning model can be subjected to supervised pre-training, for example, to perform an estimation of future demands for private cloud resources question based on currently used resources and the associated lifecycles, as well as deployment data. The machine learning model can be fine-tuned to perform the estimation of future demands for private cloud resources, using patterns of available private cloud resources within the private cloud system. The machine learning model can be fine-tuned to perform the estimation of future demands for private cloud resources, using the demands received from customer devices to minimize an error in an output of the machine learning model. The fine-tuning of the first machine learning model can include adjusting weights applied to demand estimations relative to private cloud resource types. For example, the weights applied by the machine learning model can be adjusted through backpropagation of the error (or another optimization technique) present in the recorded received demands from customer devices. As noted, the weights applied by the machine learning model can be adjusted during a temporary fine-tuning, the weights applied by the machine learning model can remain static to prevent drift and unstable behavior (e.g., loss oscillations and/or the like) after the error of the prediction drops below a particular threshold. The verification of the error can be performed according to a set frequency, and the readjustment of the weights can be reimplemented at any time the error level exceeds the acceptable error level. The predictive management process provides an advantage in minimizing the waiting time to access to the service instances by timely triggering initiation of hardware cycles that have long lead times. The optimization provided by the predictive management processes allows private cloud deployments to keep the hardware capacity at a minimum to save costs.

A demand for private cloud resources is determined, by the management console (308). The private cloud resources include hardware resources and software resources. The demand for private cloud resources can be determined by processing one or more received reports, such as the resource monitoring report, the failed deployment report, and the deployment scan report generated during any of proactive management process, reactive management process, and predictive management process that can be executed separately, in parallel, in series, or in any combination thereof. The demand for the private cloud resources can be received from one or more customer devices and can be prioritized based on estimated times to access the private cloud resources. The demand for the private cloud resources can be determined based on a failed deployment of a private cloud service.

A workflow for retrieving the private cloud resources is initiated, by the management console (310). The workflow includes parameters defining connections to networks and databases that enable an installation of hardware resources. The workflow initiation can be prioritized according to a priority ranking of different software resources requested to be accessed.

In response to receiving a confirmation of augmentation of hardware resources within the private cloud system, an availability of hardware resources relative to requested software resources is determined, by the management console (312). The evaluation of the availability of hardware resources can lead to a generation of a quantitative estimation of available hardware resources (e.g., number of CPUs and size memory, special demand of GPUs (like for machine learning services), or storage parameters like type (e.g., SSD) and size) relative to an estimated size (volume/capacity) of hardware resources for accessing the software resources (e.g., executing services). The evaluation of the availability of hardware resources can include a test execution to verify accessibility and performance of the hardware resources within the private cloud system.

An instruction to provision service instances according to the demand for the private cloud resources is provided, by the management console (314). The service instances can be provisioned according to the demand for the private cloud resources by limiting a size of an available private cloud resources to a match a requested size of a respective private cloud resource. Some registered instances can be generic (not allocated to nor configured for a specific costumer device). In response to receiving the request for provisioning a new service instance, the resource availability report can be used to execute service provisioning. An instance of a matching type of hardware resource can be used for repurposing, by applying the required parameter changes specified in the provisioning request. For example, if a high-availability redundant setup of a service was requested within the private cloud environment, multiple (e.g., two or three) instances can be selected from the available stock, to configure one as the primary resource and the other(s) as secondary resource(s) and transmit the combination of the instances as a single instance. Or, if a smaller instance is requested than available, the instance can be downsized on stock, releasing some hardware capacity that is then free for additional other installations.

The workflow is completed, by the management console (316). Completion of the workflow can include generation of a workflow report. For example, in response to determining that the software installation is complete, the new available instance can be registered for the respective service type (by transmitting the completion report to the service broker).

A deployment is initiated, by the management console (318). The deployment initiation can include generation of an alert (transmitted to a user device, such as a cloud operator device or customer device) indicating that the access to the service instances using the private cloud resources is available and provided. The deployment initiation can include actual deployment of the software solution to one or more instances of one or more cloud platforms. The execution of a deployment pipeline associated with the software solution can be actively monitored and the deployment pipeline can be scanned for generating deployment data used for subsequent predictions. For example, the deployment data can include the results of deployment of the software solution to the one or more cloud platforms, the as-is model identifying versions of components of the software solution and respective deploy targets, to which the components are deployed to.

The example process 300 advantageously enables optimized provisioning of provided service instances using an adaptable combination of management processes. The example process 300 provides insights in private cloud resource provisioning to meet expectations, optimizing processes through fine-tuning of predictive models and retraining using continuously monitored data.

Figure 4:
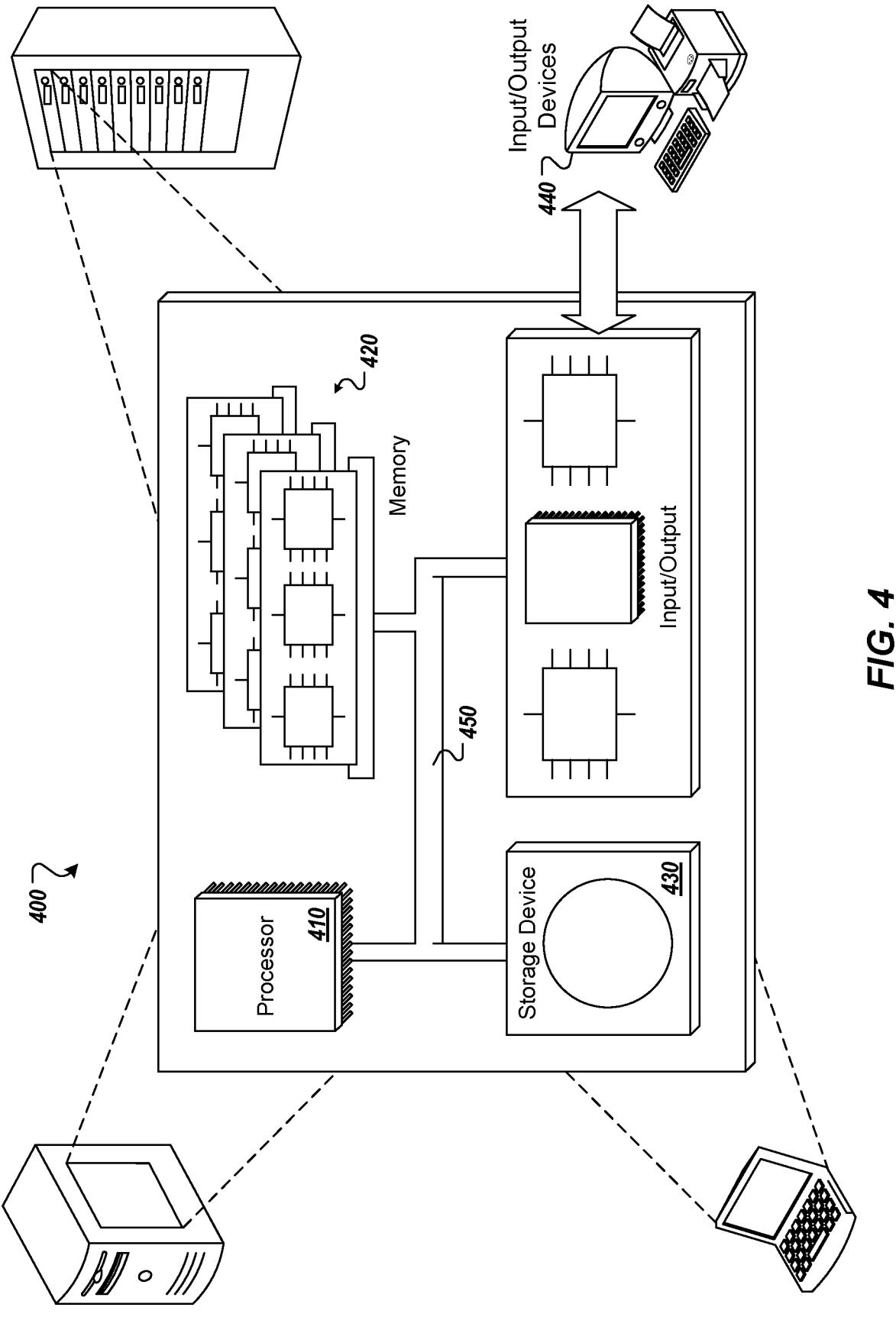
FIG. 4 is a schematic illustration of example computer systems that can be used to execute implementations of the present disclosure.

Referring now to FIG. 4, a schematic diagram of an example computing system 400 is provided. The system 400 can be used for the operations described in association with the implementations described herein. For example, the system 400 can be included in any or all of the server components discussed herein, such as the components of the example architecture 100 described with reference to FIG. 1 and/or components of the example guided backing services provisioning system 200, described with reference to FIG. 2. The system 400 includes a processor 410, a memory 420, a storage device 430, and an input/output device 440. The components 410, 420, 430, 440 are interconnected using a system bus 450. The processor 410 is capable of processing instructions for execution of processes (e.g., example process 300 described with reference to FIG. 3) within the system 400. In some implementations, the processor 410 is a single-threaded processor. In some implementations, the processor 410 is a multi-threaded processor. The processor 410 is capable of processing instructions stored in the memory 420 or on the storage device 430 to display graphical information for a user interface on the input/output device 440.

The memory 420 stores information within the system 400. In some implementations, the memory 420 is a computer-readable medium. In some implementations, the memory 420 is a volatile memory unit. In some implementations, the memory 420 is a non-volatile memory unit. The storage device 430 is capable of providing mass storage for the system 400. In some implementations, the storage device 430 is a computer-readable medium. In some implementations, the storage device 430 can be a floppy disk device, a hard disk device, an optical disk device, or a tape device. The input/output device 440 provides input/output operations for the system 400. In some implementations, the input/output device 440 includes a keyboard and/or pointing device. In some implementations, the input/output device 440 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a particular activity or bring about a particular result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random-access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps can be provided, or steps can be eliminated, from the described flows, and other components can be added to, or removed from, the described systems. Accordingly, other implementations are within the scope of the following claims.

A number of implementations of the present disclosure have been described. Nevertheless, it will be understood that various modifications can be made without departing from the spirit and scope of the present disclosure. Accordingly, other implementations are within the scope of the following claims.

In view of the above-described implementations of subject matter this application discloses the following list of examples, wherein one feature of an example in isolation or more than one feature of said example taken in combination and, optionally, in combination with one or more features of one or more further examples are further examples also falling within the disclosure of this application.

Example 1. A computer-implemented method comprising: determining, by one or more processors, a demand for private cloud resources comprising hardware resources and software resources; initiating, by the one or more processors, a workflow for retrieving the private cloud resources; determining, by the one or more processors, an availability of the private cloud resources; providing, by the one or more processors, an instruction to provision service instances according to the demand for the private cloud resources; and providing, by the one or more processors, an access to the service instances using the private cloud resources.

Example 2. The computer-implemented method of claim 1, wherein the demand is predicted based on processing deployment data of a private cloud system.

Example 3. The computer-implemented method of any of the preceding examples, wherein the deployment data is retrieved from a plurality of external data stores and comprises any of software maintenance calendars, deployment pipelines, or project schedules.

Example 4. The computer-implemented method of claim 3, further comprising: aggregating, by the one or more processors, along a timeline, the deployment data retrieved from the plurality of external data stores.

Example 5. The computer-implemented method of any of the preceding examples, wherein a hardware resource demand is predicted based on processing a software resource demand.

Example 6. The computer-implemented method of any of the preceding examples, wherein the demand is predicted based on patterns of available private cloud resources within the private cloud system.

Example 7. The computer-implemented method of any of the preceding examples, wherein the demand for the private cloud resources is received from one or more customer devices and is prioritized based on estimated times to access the private cloud resources.

Example 8. The computer-implemented method of any of the preceding examples, wherein the demand for the private cloud resources is determined based on a failed deployment of a private cloud service.

Example 9. The computer-implemented method of any of the preceding examples, wherein provisioning the service instances according to the demand for the private cloud resources comprises limiting a size of an available private cloud resources to a match a requested size of a respective private cloud resource.

Example 10. The computer-implemented method of any of the preceding examples, wherein the workflow comprises parameters defining connections to networks and databases.

Example 11. The computer-implemented method of any of the preceding examples, wherein provisioning the service instances according to the demand for the private cloud resources comprises parametrizing generic service instances based on the demand.

Example 12. A system comprising: memory storing application programming interface (API) information; and a server performing operations comprising: determining, by one or more processors, a demand for private cloud resources comprising hardware resources and software resources, initiating, by the one or more processors, a workflow for retrieving the private cloud resources, determining, by the one or more processors, an availability of the private cloud resources, providing, by the one or more processors, an instruction to provision service instances according to the demand for the private cloud resources, and providing, by the one or more processors, an access to the service instances using the private cloud resources.

Example 13. The system of example 11, wherein the demand is predicted based on processing deployment data of a private cloud system.

Example 14. The system of any of the preceding examples, wherein the deployment data is retrieved from a plurality of external data stores and comprises any of software maintenance calendars, deployment pipelines, or project schedules.

Example 15. The system of any of the preceding examples, further comprising: aggregating, by the one or more processors, along a timeline, the deployment data retrieved from the plurality of external data stores.

Example 16. The system of any of the preceding examples, wherein a hardware resource demand is predicted based on processing a software resource demand.

Example 17. The system of claim 12, wherein the demand is predicted based on patterns of available private cloud resources within the private cloud system.

Example 18. The system of any of the preceding examples, wherein the demand for the private cloud resources is received from one or more customer devices and is prioritized based on estimated times to access the private cloud resources.

Example 19. The system of any of the preceding examples, wherein the demand for the private cloud resources is determined based on a failed deployment of a private cloud service.

Example 20. A non-transitory computer-readable media encoded with a computer program, the computer program comprising instructions that when executed by one or more computers cause the one or more computers to perform operations comprising: determining, by one or more processors, a demand for private cloud resources comprising hardware resources and software resources; initiating, by the one or more processors, a workflow for retrieving the private cloud resources; determining, by the one or more processors, an availability of the private cloud resources; providing, by the one or more processors, an instruction to provision service instances according to the demand for the private cloud resources; and providing, by the one or more processors, an access to the service instances using the private cloud resources.

What is claimed is:

1. A computer-implemented method comprising:
determining, by one or more processors, prior to a receipt of a new demand for new private cloud resources and based on project schedules and an unscheduled temporary demand, a predicted demand for private cloud resources within a private cloud system, the private cloud resources comprising time variable hardware resources and software resources, the unscheduled temporary demand adding a buffer for reactive management of the private cloud resources in addition to planned management of the private cloud resources, wherein the predicted demand for the private cloud resources is received from one or more customer devices and is prioritized based on estimated times to access the private cloud resources;
initiating, by the one or more processors, a workflow for retrieving the private cloud resources;
determining, by the one or more processors, an availability of the private cloud resources;
estimating a shortage of the private cloud resources according to a limit of the availability of the private cloud resources to provision unscheduled service instances;
providing, by the one or more processors, an instruction to provision service instances according to the predicted demand for the private cloud resources, wherein an allocation of the private cloud resources is adjusted to compensate for the shortage of private cloud resource; and
providing, by the one or more processors, an access to the service instances using the private cloud resources.

2. The computer-implemented method of claim 1, wherein the predicted demand is predicted based on processing deployment data of the private cloud system.

3. The computer-implemented method of claim 2, wherein the deployment data is retrieved from a plurality of external data stores and comprises any of software maintenance calendars, deployment pipelines, or project schedules.

4. The computer-implemented method of claim 3, further comprising:
aggregating, by the one or more processors, along a timeline, the deployment data retrieved from the plurality of external data stores.

5. The computer-implemented method of claim 2, wherein the predicted demand is predicted based on processing a software resource demand.

6. The computer-implemented method of claim 2, wherein the predicted demand is predicted based on patterns of available private cloud resources within the private cloud system.

7. The computer-implemented method of claim 1, wherein the predicted demand for the private cloud resources is determined based on a failed deployment of a private cloud service.

8. The computer-implemented method of claim 1, wherein provisioning the service instances according to the predicted demand for the private cloud resources comprises limiting a size of an available private cloud resources to match a requested size of a respective private cloud resource.

9. The computer-implemented method of claim 1, wherein the workflow comprises parameters defining connections to networks and databases.

10. The computer-implemented method of claim 1, wherein provisioning the service instances according to the predicted demand for the private cloud resources comprises parametrizing generic service instances based on the predicted demand.

11. A system comprising:
memory storing application programming interface (API) information; and
a server performing operations comprising:
determining, by one or more processors, prior to a receipt of a new demand for new private cloud resources and based on project schedules and an unscheduled temporary demand, a predicted demand for private cloud resources within a private cloud system, the private cloud resources comprising time variable hardware resources and software resources, the unscheduled temporary demand adding a buffer for reactive management of the private cloud resources in addition to planned management of the private cloud resources, wherein the predicted demand for the private cloud resources is received from one or more customer devices and is prioritized based on estimated times to access the private cloud resources;
initiating, by the one or more processors, a workflow for retrieving the private cloud resources;
determining, by the one or more processors, an availability of the private cloud resources;
estimating a shortage of the private cloud resources according to a limit of the availability of the private cloud resources to provision unscheduled service instances;
providing, by the one or more processors, an instruction to provision service instances according to the predicted demand for the private cloud resources, wherein an allocation of the private cloud resources is adjusted to compensate for the shortage of private cloud resource; and
providing, by the one or more processors, an access to the service instances using the private cloud resources.

12. The system of claim 11, wherein the predicted demand is predicted based on processing deployment data of a private cloud system.

13. The system of claim 12, wherein the deployment data is retrieved from a plurality of external data stores and comprises any of software maintenance calendars, deployment pipelines, or project schedules.

14. The system of claim 13, further comprising:
aggregating, by the one or more processors, along a timeline, the deployment data retrieved from the plurality of external data stores.

15. The system of claim 12, wherein the predicted demand is predicted based on processing a software resource demand.

16. The system of claim 12, wherein the predicted demand is predicted based on patterns of available private cloud resources within the private cloud system.

17. The system of claim 11, wherein the predicted demand for the private cloud resources is determined based on a failed deployment of a private cloud service.

18. A non-transitory computer-readable media encoded with a computer program, the computer program comprising instructions that when executed by one or more computers cause the one or more computers to perform operations comprising:

determining, by one or more processors, prior to a receipt of a new demand for new private cloud resources and based on project schedules and an unscheduled temporary demand, a predicted demand for private cloud resources within a private cloud system, the private cloud resources comprising time variable hardware resources and software resources, the unscheduled temporary demand adding a buffer for reactive management of the private cloud resources in addition to planned management of the private cloud resources, wherein the predicted demand for the private cloud resources is received from one or more customer devices and is prioritized based on estimated times to access the private cloud resources;

initiating, by the one or more processors, a workflow for retrieving the private cloud resources;

determining, by the one or more processors, an availability of the private cloud resources;

estimating a shortage of the private cloud resources according to a limit of the availability of the private cloud resources to provision unscheduled service instances;

providing, by the one or more processors, an instruction to provision service instances according to the predicted demand for the private cloud resources, wherein an allocation of the private cloud resources is adjusted to compensate for the shortage of private cloud resource; and providing, by the one or more processors, an access to the service instances using the private cloud resources.

* * * * *